US010810899B1

(12) United States Patent
MacGillivray et al.

(10) Patent No.: US 10,810,899 B1
(45) Date of Patent: Oct. 20, 2020

(54) VIRTUAL INSTRUCTION TOOL

(71) Applicant: Google LLC, Mountain View, CA (US)

(72) Inventors: Ian MacGillivray, New York, NY (US); Darwin Yamamoto, Brookyln, NY (US); Jon Bedard, New York, NY (US)

(73) Assignee: Google LLC, Mountain View, CA (US)

( * ) Notice: Subject to any disclaimer, the term of this patent is extended or adjusted under 35 U.S.C. 154(b) by 345 days.

(21) Appl. No.: 15/830,806

(22) Filed: Dec. 4, 2017

Related U.S. Application Data

(60) Provisional application No. 62/430,074, filed on Dec. 5, 2016.

(51) Int. Cl.
| | |
|---|---|
| *G09B 9/00* | (2006.01) |
| *G06T 17/10* | (2006.01) |
| *G09B 19/00* | (2006.01) |
| *G06T 19/00* | (2011.01) |

(52) U.S. Cl.
CPC ............ *G09B 9/00* (2013.01); *G06T 17/10* (2013.01); *G06T 19/006* (2013.01); *G09B 19/00* (2013.01); *G09B 19/0092* (2013.01)

(58) Field of Classification Search
CPC ........ G06T 19/006; G06T 2207/20081; G09B 19/24; G09B 19/00; G09B 19/003; G09B 9/00
See application file for complete search history.

(56) References Cited

U.S. PATENT DOCUMENTS

| | | | |
|---|---|---|---|
| 2005/0058969 | A1 | 3/2005 | Matthews et al. |
| 2009/0177452 | A1* | 7/2009 | Ullrich .................. A61B 34/76 703/11 |
| 2009/0202972 | A1 | 8/2009 | Adhami et al. |
| 2010/0048273 | A1* | 2/2010 | Wallace .................. G09B 9/00 463/7 |
| 2013/0203026 | A1 | 8/2013 | Sundaresh et al. |
| 2014/0308647 | A1 | 10/2014 | Shimata et al. |

(Continued)

OTHER PUBLICATIONS

"Vive PRE User Guide", 2016 HTC Corporation, 28 pages.
(Continued)

*Primary Examiner* — Jerry-Daryl Fletcher
(74) *Attorney, Agent, or Firm* — Brake Hughes Bellermann LLP

(57) ABSTRACT

A method includes: identifying a physical environment to be a basis for virtual training, the physical environment associated with performance of operations; creating, in a computer system, a three-dimensional (3D) model of the physical environment; defining, in the computer system, virtual operations to be performable during the virtual training, the virtual operations corresponding to the operations of the physical environment; identifying, in the computer system, a controllable component in the physical environment; creating, in the computer system, a 3D model of the identified controllable component; creating, in the computer system, a state model of the physical environment; and assembling, in the computer system, a virtual environment from the 3D model of the physical environment and the 3D model of the identified controllable component, and associating the created state model with the virtual environment.

20 Claims, 10 Drawing Sheets

(56) References Cited

U.S. PATENT DOCUMENTS

2015/0138099 A1* 5/2015 Major .................. A63F 13/211
                                                    345/173
2017/0053440 A1* 2/2017 Yoon ....................... G06F 3/167
2018/0130260 A1* 5/2018 Schmirler .......... G05B 23/0216

OTHER PUBLICATIONS

Andersen, et al., "Using pagerank to locally partition a graph", CHI'12, May 5-10, 2012, 10 pages.
Romano, "Oculus Rift brings a whole new dimension to communication", retrieved on Nov. 21, 2017 from https://phys.org/news/2014-03-oculus-rift-dimension.html, Mar. 28, 2014, 2 pages.

* cited by examiner

VIRTUAL INSTRUCTION TOOL

CROSS-REFERENCE TO RELATED APPLICATION

This application is a non-provisional of, and claims the benefit of the filing date of, U.S. Provisional Application No. 62/430,074, filed on Dec. 5, 2016, and entitled "VIRTUAL INSTRUCTION TOOL", the contents of which are hereby incorporated herein by reference.

TECHNICAL FIELD

This document relates, generally, to a virtual instruction tool.

BACKGROUND

Training a person to perform a series of tasks on a piece of equipment has been done using a few different approaches. One approach is to have an instructor and the person to be trained (hereafter the "trainee") appear in person at the equipment, and the instructor then guides the person on learning the respective tasks or operations to be performed. This requires the equipment to be available for the training, which can take resources away from production or other use. It also requires the instructor to physically relocate to the location of the equipment, or vice versa. Finally, it can be dangerous for the trainee to use the actual equipment until he or she has been successfully trained. Another approach is to provide the trainee with written instruction materials, such as a user guide. However, this training does not provide the trainee an opportunity to actually perform any tasks, but merely learn the instructions for doing so. Also, this approach may not provide an efficient way of evaluating whether the trainee has learned the training materials. Yet another approach is to present the trainee with video-based instructions on the tasks. This approach, too, may not provide the trainee an opportunity to actually perform any tasks, and may lack efficient evaluation of the trainee.

SUMMARY

In a first aspect, a method includes: identifying a physical environment to be a basis for virtual training, the physical environment associated with performance of operations; creating, in a computer system, a three-dimensional (3D) model of the physical environment; defining, in the computer system, virtual operations to be performable during the virtual training, the virtual operations corresponding to the operations of the physical environment; identifying, in the computer system, a controllable component in the physical environment; creating, in the computer system, a 3D model of the identified controllable component; creating, in the computer system, a state model of the physical environment; and assembling, in the computer system, a virtual environment from the 3D model of the physical environment and the 3D model of the identified controllable component, and associating the created state model with the virtual environment.

Implementations can include any or all of the following features. Identifying the physical environment can include identifying a machine having the controllable component, wherein the controllable component is configured to be actuated by physical action, and wherein creating the 3D model of the identified controllable component comprises taking into account the physical action of the controllable component. Identifying the physical environment can include identifying a machine having the controllable component, wherein the controllable component is configured to be actuated by physical action, the method further comprising identifying a distance to move the controllable component to actuate the physical action, wherein the created state model reflects the identified distance. Creating the state model can include defining at least one state as an operation performed on the 3D model of the controllable component, the operation being part of the virtual training. Creating the state model can further include defining, based on the identified physical environment, one or more transitions from the state based on the operation. Creating the state model can include defining results configured to be presented as feedback in response to a user undergoing the virtual training. The results can include at least a success result and a failure result. Defining the results can include defining a consequence of handling the controllable component during the virtual training, the consequence defined based on the identified physical environment. The consequence can indicate an injury to the user. Defining the results can include defining a quantified feedback based on the user handling the controllable component. The controllable component can require movement by a distance, and wherein the quantified feedback reflects a percentage completion of the distance. The method can further include performing the virtual training using the virtual environment and the created state model, the virtual training performed for a user and involving presenting to the user the virtual environment including the 3D model of the physical environment and the 3D model of the identified controllable component, receiving input from the user, and providing feedback to the user using the created state model based on the input. Providing the feedback can include providing at least one of tactile feedback or haptic feedback. The feedback can be based on a detected impact in the virtual environment. Providing the feedback can include determining whether the detected impact corresponds to damage.

In a second aspect, a computer program product is tangibly embodied in a non-transitory medium, the computer program product comprising instructions that when executed by at least one processor cause operations to be performed, the operations including: identifying a physical environment to be a basis for virtual training, the physical environment associated with performance of operations; creating, in a computer system, a three-dimensional (3D) model of the physical environment; defining, in the computer system, virtual operations to be performable during the virtual training, the virtual operations corresponding to the operations of the physical environment; identifying, in the computer system, a controllable component in the physical environment; creating, in the computer system, a 3D model of the identified controllable component; creating, in the computer system, a state model of the physical environment; and assembling, in the computer system, a virtual environment from the 3D model of the physical environment and the 3D model of the identified controllable component, and associating the created state model with the virtual environment.

In a third aspect, a computer program product is tangibly embodied in a non-transitory medium, the computer program product comprising instructions that when executed by at least one processor cause a graphical user interface to be presented, the graphical user interface including: a three-dimensional (3D) model of a physical environment, the physical environment associated with performance of operations and having been identified to be a basis for a virtual training of a user, wherein virtual operations are defined to be performed in the 3D model, the performance operations corresponding to the operations of the physical environment; a 3D model of a controllable component having been identified in the physical environment, the 3D model of the controllable component associated with a state model of the physical environment; and an input associated with the 3D model of the controllable component, the input generated by the user using the 3D model of the controllable component, wherein the graphical user interface provides feedback to the user based on the state model.

Implementations can include any or all of the following features. The graphical user interface can further include a hint control regarding the virtual operations. The graphical user interface can further include a ghost version of the 3D model of the identified controllable component. The graphical user interface can further include a user manual object presented in the 3D model of the physical environment, the user manual object comprising written instructions for the identified controllable component.

BRIEF DESCRIPTION OF DRAWINGS

Like reference symbols in the various drawings indicate like elements.

DETAILED DESCRIPTION

This document describes examples of training a user to perform one or more physical tasks using a virtual environment. In some implementations, the virtual environment is a to-scale representation of the equipment and/or training environment. The virtual environment can have movable controls with which the user can virtually interact during the training to get a more hands-on experience of performing the physical tasks. A system can track the user's performance of a sequence of tasks, and can provide feedback to the user. For example, such feedback can include an overall pass/fail status or percentage of success. However, in some implementations the feedback can be more sophisticated and nuanced. For example, the system can inform a less than fully successful trainee that one or more desired results of the operations would not have occurred in a physical environment (or that one or more undesirable results would have occurred), as a result of how the trainee performed at least one of the tasks during the virtual training. In some implementations, the virtual environment can include one or more aspects of an augmented reality environment. The augmented reality environment can include imagery of a physical reality (e.g., a camera view of the user's surroundings) and imagery of virtual reality (e.g., a virtual object). For example, a system that provides an augmented reality environment can include optics that allow overlay of one or more virtual elements in addition to pass through camera. Such optical components can include pass-through cameras mounted to (or incorporated into) a display associated with a head-mounted display (HMD) device. Image content captured by the pass-through cameras can be combined with virtual content in a display of the HMD device configured to provide a number of graphical user interface (GUI) configurations. The GUI configurations may refer to locations of pass-through areas or virtual content areas with respect to a view provided to the user, a ratio of pass-through content to virtual content, a ratio of fade or transparency of any content provided within the HMD device, and/or a shape or size associated with the virtual content or the pass-through content or both, just to name a few examples.

Figure 1:
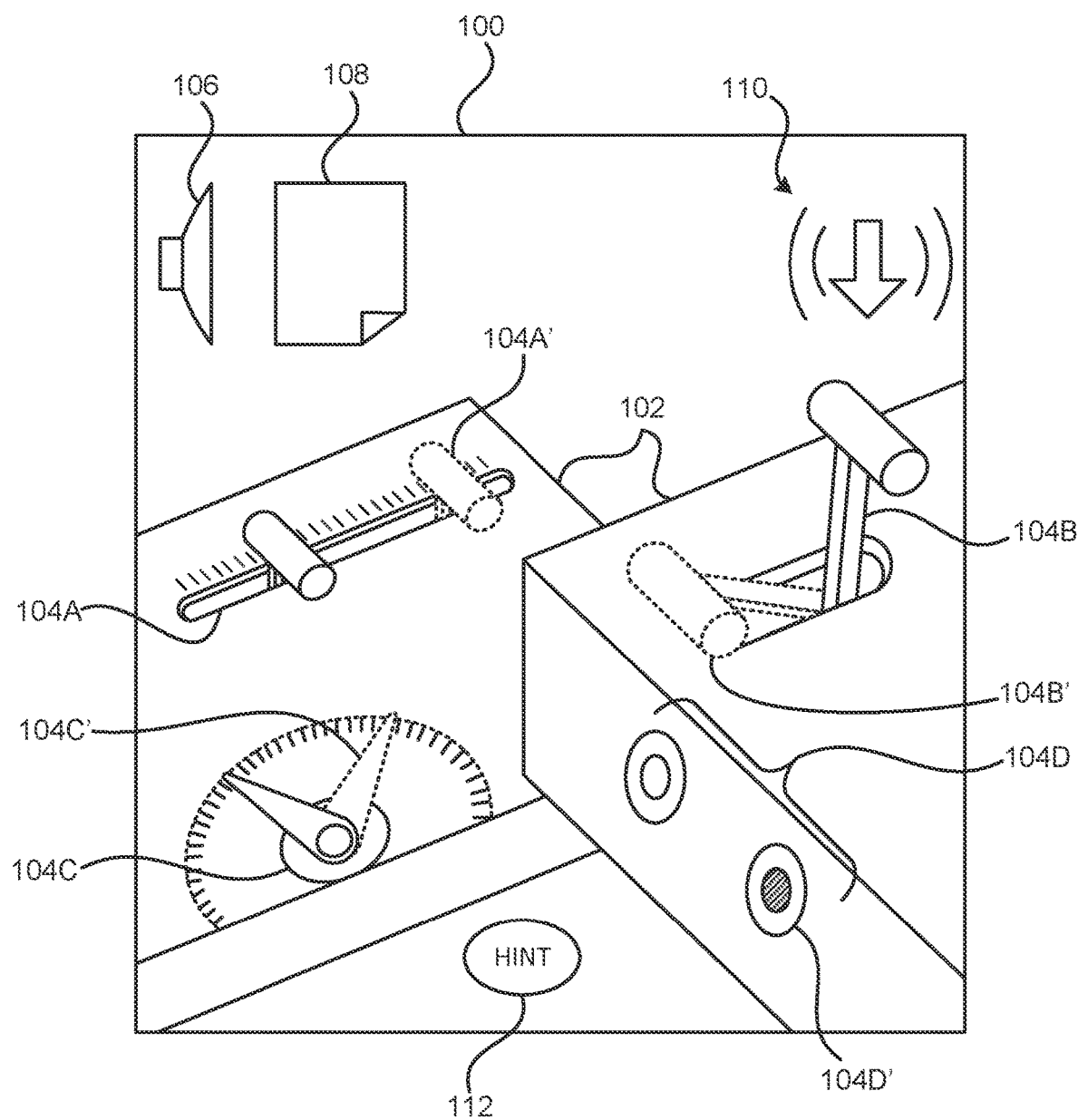
FIG. 1 shows an example of an instruction tool with a virtual environment.

FIG. 1 shows an example of an instruction tool with a virtual environment 100. The virtual environment 100 can be generated and presented in any suitable context that provides an immersive experience. For example, the virtual environment 100 can be presented on the screen of a desktop or laptop computer, or in a virtual reality (VR) headset. The trainee can interact with one or more aspects of the virtual environment 100 in order to train for performing physical tasks or other operations.

The virtual environment 100 can include one or more three-dimensional (3D) models. Here, workbenches 102 are partially visible. For example, the workbenches are virtual representations of physical equipment that can be used in any of various environments, including, but not limited to, a factory, a plant, a laboratory, a cockpit, a control room, a shop, a steering console, and/or a dashboard. The virtual environment 100 can be generated to be a simulacrum of the physical environment where the operations are to be performed. As another example, the virtual environment 100 can include imagery of a physical reality (e.g., images of physical workbenches) and imagery of virtual reality (e.g., a virtual control, or a virtual setting of a physical control).

The virtual environment 100 can include one or more controls. Here, controls 104A-D are shown as examples. Control 104A can be a slider control having a slider that is adjustable in two or more, or continuous, positions along a slot or other track. Control 104A' is a ghost version of the slider control. Control 104B can be a lever that is adjustable in two or more, or continuous, positions on one of the workbenches. Control 104B' is a ghost version of the lever control. Control 104C can be a rotary control that is adjustable in two or more, or continuous, positions. Control 104C' is a ghost version of the rotary control. Controls 104D are pushbuttons or other switches on one of the workbenches. Each of the controls 104D can be actuated in two or more positions (e.g., on/off). Control 104D' is a ghost representation of one of the controls 104D in a depressed position.

The training program can be defined so that the trainee is expected to perform a series of tasks in the virtual environment 100. In some implementations, the tasks can include, but are not limited to, sliding the slider control 104A to a particular position, actuating the lever control 104B to a down position, turning the rotary control 104C clockwise to a specific position, and/or pressing one or more of the pushbutton controls 104D. The inputs corresponding to the respective such operations in the virtual environment 100 can be generated using any suitable input device capable of generating an input recognizable by the virtual environment 100. For example, this input can be generated using a tracked controller worn by the trainee, such as a data glove. In some implementations, the trainee's actions in the virtual environment 100 can be performed by way of a virtual manipulator, such as a virtual hand or other cursor, that the trainee first places on or near the respective control to then effectuate the movement of the control in the intended way.

One or more forms of guidance can be provided in the virtual environment 100. Here, a speaker symbol 106 can be used to play or stop audio instructions. For example, the instructions can include the sound of a voice instructing the trainee which controls to adjust, how much adjustment to make, and/or the proper order of the operations. A user manual object 108 can contain written instructions, or can trigger presentation of the written instructions when actuated. For example, the written instructions can include a description in a language understood by the trainee of the operations to be performed in the virtual environment 100. A tooltip object 110, finally, illustrates that the virtual environment 100 can indicate to the trainee which operation should be performed next, or which operations are possible in the current state of the virtual environment 100. In some implementations, the tooltip object 110 can include a visual indication of an action to be performed and/or a highlight of the relevant control(s). For example, a highlight such as a moving arrow can draw the trainee's attention to the proper control. The user can prompt the system for a hint or other help in performing the next operation. In some implementations, a hint control 112 can be used by the trainee when assistance is needed. The hint can cause an audible, textual and/or symbolic help to be provided. Then, the audio instruction for the next operation, the part of the guidelines relating to the next operation, the tooltip object 110 for the next operation, and/or the ghost version of the controller (e.g., the control 104A') can be presented, to name just a few examples.

The system can provide one or more forms of response to the performance of an operation. In some implementations, tactile or haptic feedback can indicate that any of the controls 104A-D is being moved and/or has reached a particular setting. As another example, the feedback can indicate whether the operation was the correct one to perform at this stage of the sequence of tasks, or whether the operation was correctly or incorrectly performed (e.g., a lever was pulled too far or not far enough).

Figure 2A:
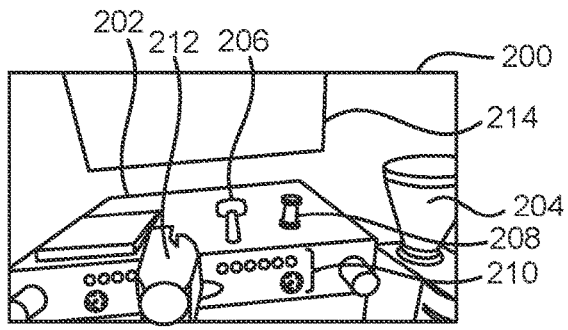
FIGS. 2A-N show another example of an instruction tool with a virtual environment.
Figure 2B:
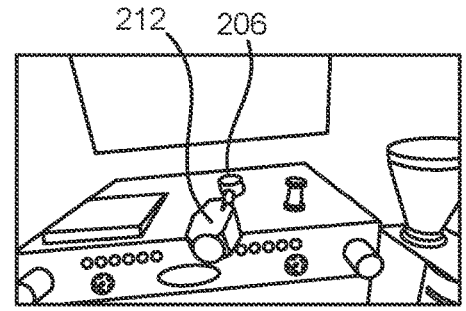
Figure 2C:
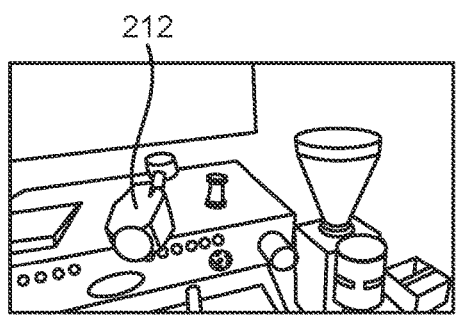
Figure 2D:
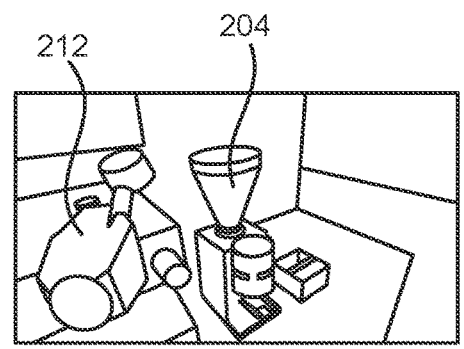
Figure 2E:
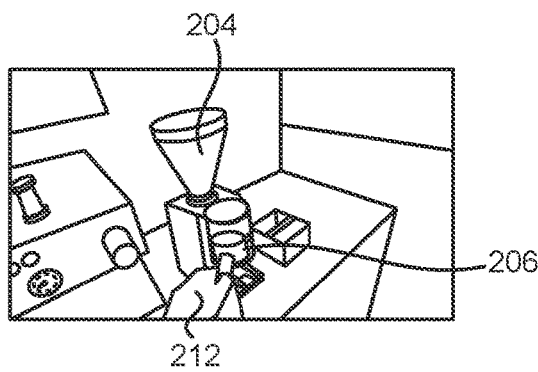
Figure 2F:
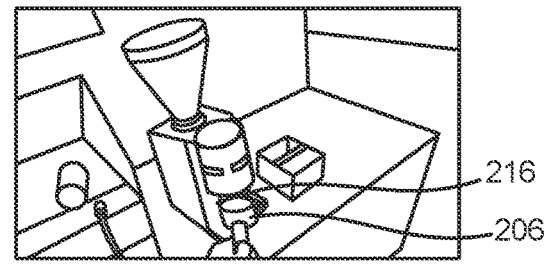
Figure 2G:
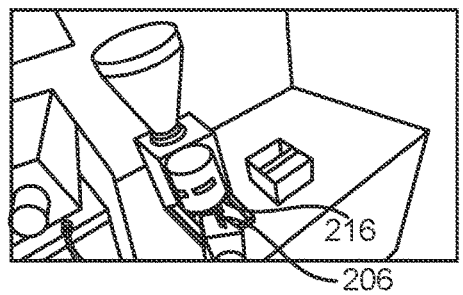
Figure 2H:
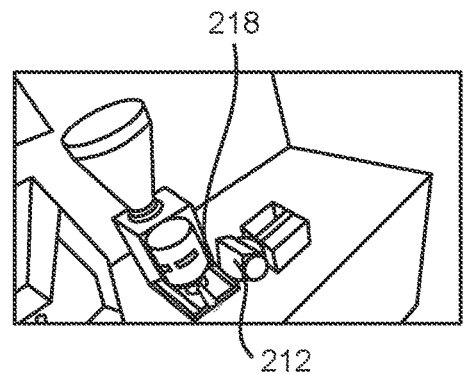
Figure 2I:
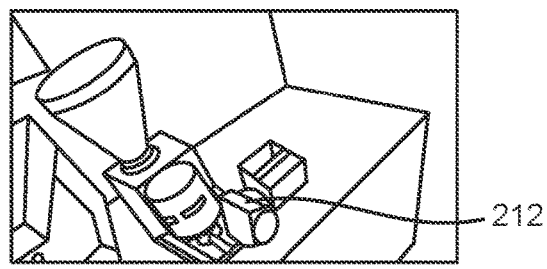
Figure 2J:
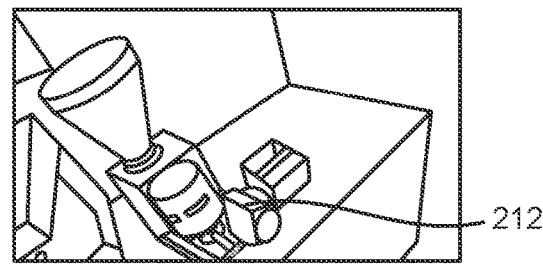
Figure 2K:
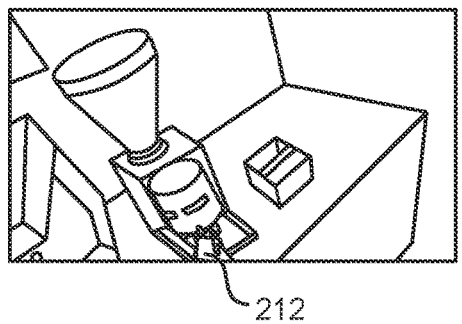
Figure 2L:
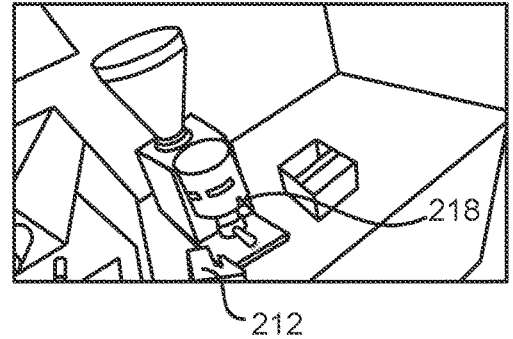
Figure 2M:
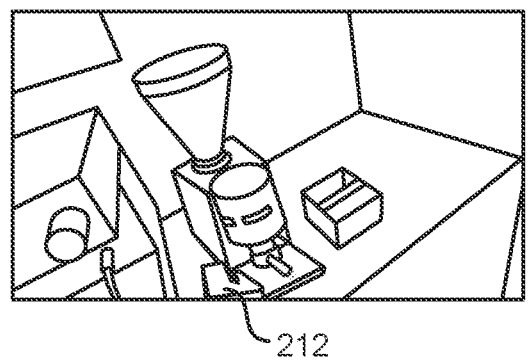
Figure 2N:
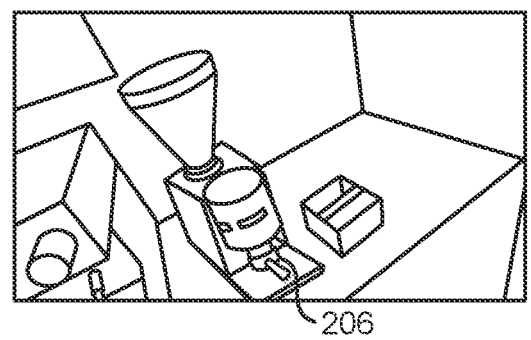

FIGS. 2A-N show another example of an instruction tool with a virtual environment 200. This example relates to training a person in using an espresso machine to make coffee. The virtual environment 200 therefore here includes an espresso machine 202 and a coffee grinder 204. One or more controls can be provided in the virtual environment 200 corresponding to a tool that would be employed in the real environment when making coffee using a corresponding machine. For example, a portafilter 206 is a container for brewing the coffee, and a tamp 208 is a tool that can be used for compacting coffee grounds in the portafilter 206 prior to the brewing. One or more other controls 210 can be provided, such as to regulate the operation of the espresso machine 202. A hand 212 is a virtual manipulator that the trainee can use to interact with one or more controllable objects in the virtual environment 200, including, but not limited to, the espresso machine 202, the coffee grinder 204, the portafilter 206, the tamp 208, and/or the control(s) 210. An object 214 can be used to obtain assistance, such as instructions and/or hints, regarding any or all of the tasks to be performed. For example, the object 214 can include a floating display of written instructions.

In some implementations, the virtual environment 200 can include a full physics simulation of the 3D models, and of all interactions between them. For example, in such a situation the trainee could inadvertently break something in the virtual environment 200 by applying sufficient virtual force using the hand 212. In other implementations, however, less than a full physics simulation can be provided. The items in the virtual environment 200, such as the espresso machine 202, the coffee grinder 204, the portafilter 206, the tamp 208, and/or the control(s) 210, can be defined so that they can only assume any of two or more predefined states. For example, the portafilter 206 can have permissible states that include only: sitting on top of the espresso machine 202, being attached to the head on the espresso machine (to be shown below), being held in the air somewhere in the vicinity of the espresso machine or the coffee grinder 204, or being attached to the coffee grinder (to be shown below).

One or more hints and/or tips to the trainee can be provided. In some implementations, some or all of the above objects are configured so that the system can highlight that object to the trainee's attention (e.g., by presenting a tooltip and/or by showing a ghost version of the object corresponding to how the trainee should move or actuate that particular control). For example, the trainee can be encouraged to use hints/tips the first time he or she performs the training procedure, and thereafter try to complete the training without them.

Assume now that the trainee is participating in a training session in the virtual environment 200 for using the espresso machine 202. In particular, the next step to be performed is to fill the portafilter 206 with an appropriate amount of ground coffee beans. FIG. 2B shows that the trainee has advanced the hand 212 toward the portafilter 206. For example, a tracked controller can register the movement of the trainee's own hand and map that signal into a corresponding movement of the hand 212. In some implementations, the user performs an active grasping motion to grab the portafilter 206 or other object. In other implementations, placing the hand 212 sufficiently close to the relevant object can trigger the grasping action. Here, the hand 212 has currently grasped the portafilter 206, and the trainee can therefore move the portafilter to another location in the virtual environment 200. FIGS. 2C and 2D show that the trainee is raising the portafilter into the air using the hand 212. In FIG. 2D, the trainee's line of sight in the virtual environment 200 is turning, so as to face more towards the coffee grinder 204. For example, this can be triggered by the movement of the hand 212 and or by the trainee turning his or her head in that direction (e.g., as detected by a VR headset that is being worn).

In FIG. 2E the trainee is extending the hand 212 holding the portafilter 206 toward the coffee grinder 204. In FIG. 2F, moreover, the trainee has aligned the portafilter 206 with an outlet 216 of the coffee grinder 204. FIG. 2G, finally, shows that the trainee inserts the front of the portafilter 206 into the outlet 216. For example, this can be a predefined location or other state for the portafilter.

FIG. 2H shows that the trainee has released the portafilter from the hand 212 and is instead extending the hand toward a mechanism 218 on the coffee grinder. For example, this can control how much coffee grounds the grinder dispenses into the portafilter. FIG. 2I shows that the trainee grasps the mechanism using the hand 212. FIG. 2J shows that the trainee actuates the mechanism using the hand 212. For example, the mechanism can be defined in the virtual environment 200 so that it is movable horizontally about the body of the coffee grinder in an essentially circular motion. FIG. 2K shows that the trainee uses the hand 212 to pull the mechanism horizontally toward the front of the coffee grinder. FIG. 2L shows that the hand 212 has released its grip on the mechanism 218. In some implementations, the release causes the mechanism to begin to retract back towards its original position. For example, the hand 212 can automatically release the mechanism when a certain position is reached. FIG. 2M shows that the hand 212 is being removed away from the coffee grinder. In FIG. 2N, the portafilter 206 remains attached to the coffee grinder after having a particular amount of coffee grounds dispensed into it. Thus, the above example illustrates the virtual training of dispensing coffee grounds into a portafilter for use in an espresso machine.

Whether the trainee is considered to have successfully performed this stage of the training can depend on one or more factors. For example, and without limitation, it can be taken into account whether the trainee:

grasped the correct tool (here, the portafilter);

held the tool properly (e.g., by the handle);

properly maneuvered the tool (e.g., inserted it into the correct location on the coffee grinder);

operated the coffee grinder properly (e.g., caused it to dispense grounds);

dispensed the proper type of substance into the tool (e.g., the correct kind of coffee beans when more than one type is available);

dispensed the correct amount of grounds into the portafilter (e.g., one shot of espresso or two); and/or properly removed the portafilter from the coffee grinder (e.g., without excessive spilling).

The system that generates the virtual environment 200 can provide one or more kinds of feedback to the trainee as a result of the training session. In some implementations, the feedback can indicate whether the trainee was successful in dispensing the coffee grounds, and, if not completely successful, what the likely result would have been in the real-life situation. For example, the system can indicate one or more problems with the resulting cup of coffee, or that a problem would have occurred with the equipment. In some implementations, step-by-step feedback can be provided.

FIGS. 3A-K show another example of an instruction tool with a virtual environment 300. Some objects in the virtual environment 300 can be similar or identical to those in the virtual environment 200 (FIGS. 2A-N) above. For example, the virtual environment 300 includes the espresso machine 202, the portafilter 206, the tamp 208 and the virtual hand 212. The hand 212 is currently grasping a handle of the portafilter 206, and the latter is attached to a head 302 of the espresso machine 202, sometimes referred to as a grouphead. In some implementations, the portafilter 206 should be attached to the head 302 by way of an operation that is part of the virtual training program for the trainee. For example, the portafilter and the head can form a bayonet mount such that the proper attachment procedure involves first aligning the portafilter with the head, then rotating the portafilter horizontally to engage with the head and thereby accomplish a partial insertion, and finally rotating the portafilter horizontally in an opposite direction so as to engage the bayonet mount and firmly attach the portafilter to the head. A virtual instruction tool can provide immersive training in such a procedure, for example as will now be described.

Figure 3A:
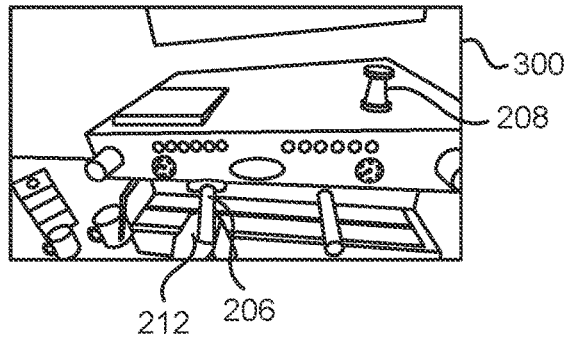
FIGS. 3A-K show another example of an instruction tool with a virtual environment.
Figure 3B:
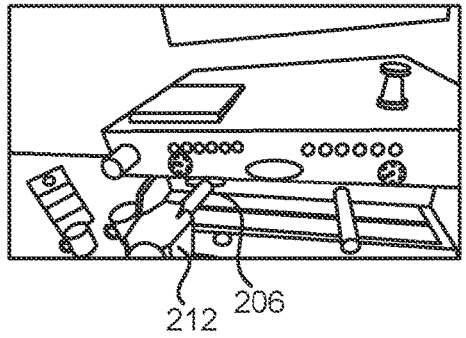
Figure 3C:
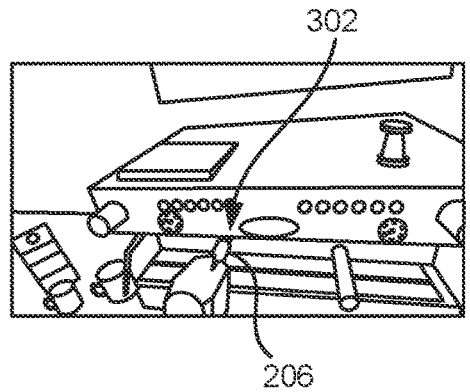
Figure 3D:
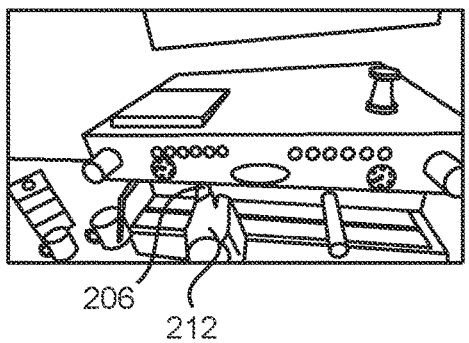
Figure 3E:
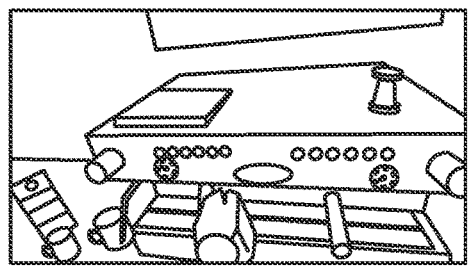

In FIG. 3A, the trainee has aligned the portafilter 206 with the head 302 (FIG. 3C) using the hand 212. FIG. 3B shows that the trainee moves the hand 212 to the left, thereby rotating the portafilter 206 clockwise. For example, this can seek to position the components of the bayonet mount for proper engagement. FIG. 3C shows that the bayonet mount has engaged. For example, the portafilter 206 can now be partially inserted into the head 302. FIG. 3D shows that the trainee moves the hand 212 to the right, thereby turning the portafilter 206 counterclockwise. For example, this can firmly engage the components to each other and attach them together, as shown in FIG. 3E.

Figure 3F:
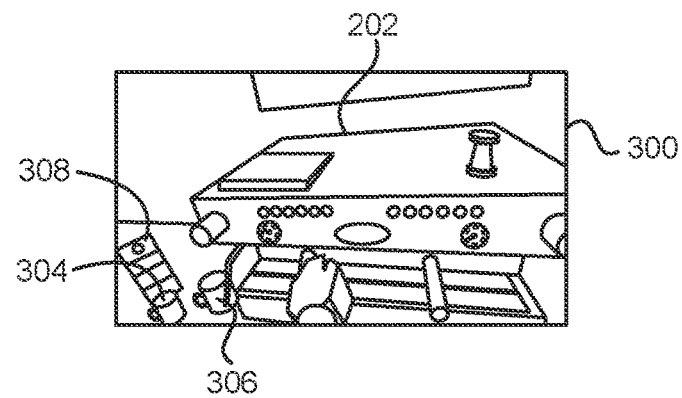

FIG. 3F shows that the trainee begins to look toward the left in the virtual environment 300, for example by turning his or her head while wearing a VR headset. To the left of the espresso machine 202 are a mug 304, a milk jar 306, and a milk carton 308. In some implementations, the next operation in the virtual training process is to pick up the mug 304. For example, this can be done for purpose of placing the mug under the portafilter on the espresso machine so as to provide a receptacle for the coffee being made.

Figure 3G:
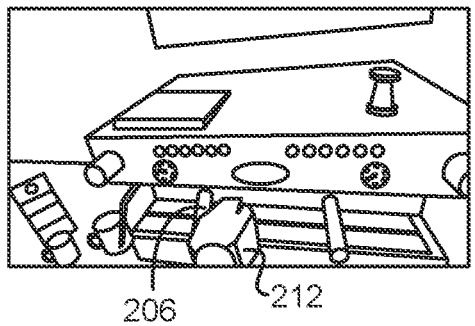
Figure 3H:
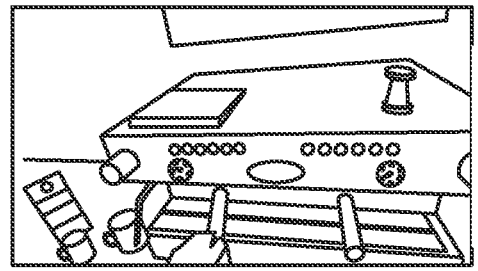
Figure 3I:
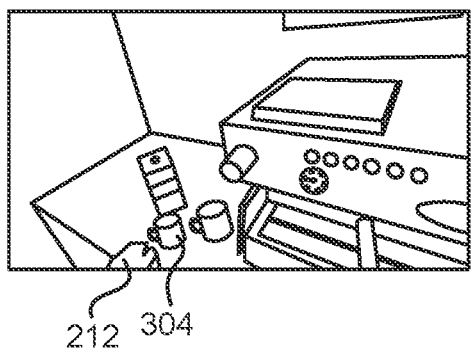
Figure 3J:
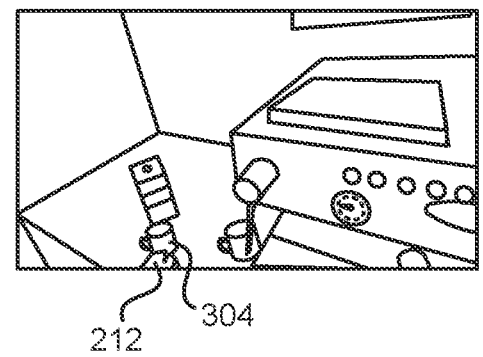
Figure 3K:
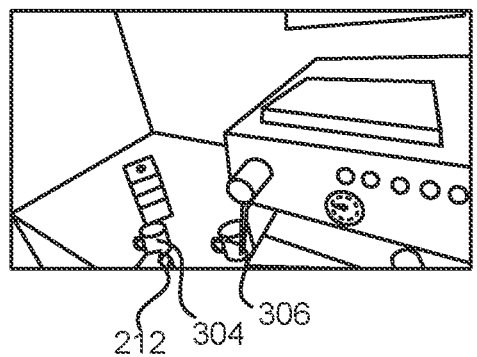

FIG. 3G shows that the trainee releases the portafilter 206 with the hand 212. FIG. 3H shows that the trainee turns his or her gaze further toward the left in the virtual environment 300. FIG. 3I shows that the trainee extends the hand 212 toward the mug 304. FIG. 3J shows that the trainee grasps the mug 304 with the hand 212, either automatically based on proximity or by a grasping motion captured by a tracked controller. FIG. 3K shows that the trainee has picked up the mug 304 in the air using the hand 212. Also, the milk jar 306 was displaced somewhat in the process of picking up the mug. In some implementations, this can be the result of the virtual environment 300 detecting an impact on the milk jar 306 from the hand 212 or the mug 304. For example, the feedback to the trainer can indicate whether this was likely to have tipped over or damaged the milk jar.

A system that provides a virtual instruction tool can use one or more models to analyze the trainee's performance and to give substantive feedback thereon, in real time and/or afterwards as a final assessment. For example, a state model can define the possible states that a particular virtual environment can assume, and define the effect, if any, on the state(s) for any input that the trainee can make during the training session.

Figure 4:
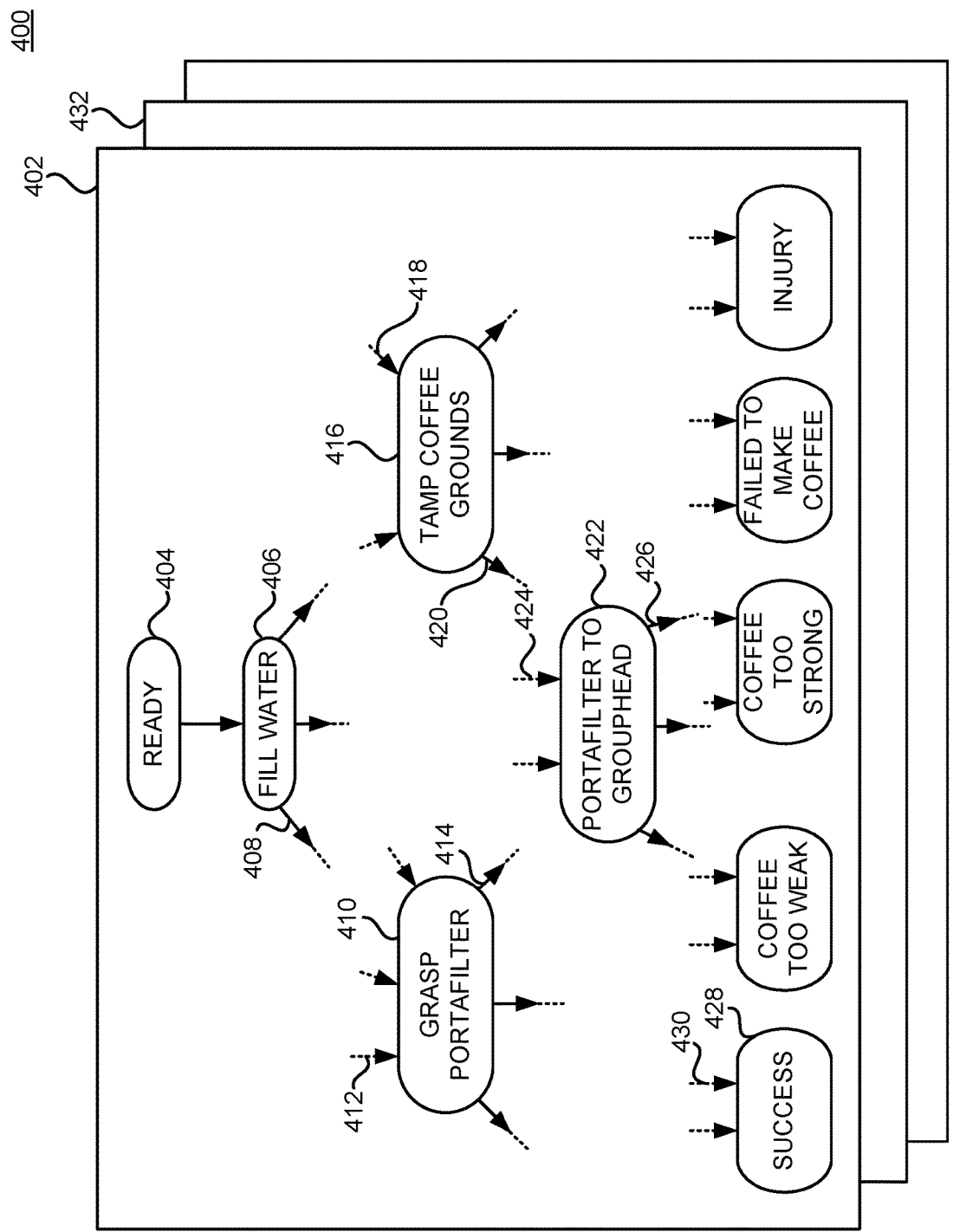
FIG. 4 shows an example of a state model.

FIG. 4 shows an example of a state model 400. The state model 400 can define the states, inputs and corresponding results for any type of virtual training procedure regarding any kind of equipment or any form of physical operations. In this example, the state model 400 includes a coffee-making model 402. In this example, the model 402 defines all states, input and corresponding results for the procedure of making coffee using an espresso machine, such as in the examples above. For clarity, not all states, inputs and results are shown, but only an illustrative selection thereof.

A ready state 404 indicates that the espresso machine in the virtual environment is ready for the trainee to begin the process of making coffee as part of the training program. A state 406 corresponds to the operation where the trainee ensures that the espresso machine has a supply of water (e.g., by a hose from a remote supply, or by filling an internal tank). Once the trainee causes the virtual environment to enter the state 406, any of multiple state transitions 408 can occur. Each transition is here illustrated using an arrow extending away from the state 406, the arrow partially dashed to indicate one or more possible states (not shown) to which the system can transition according to the corresponding result. For example, one of the transitions 408 corresponds to success, another to providing an insufficient amount of water, and the third to the trainee inadvertently providing a liquid other than water (e.g., milk) into the machine. Through either of the transitions 408, the system can transition into another one of the states of the model 402, or to an overall result, to be described below.

A state 410 corresponds to the operation where the trainee grasps the portafilter for purposes of filling it with coffee grounds (see, e.g., FIG. 2B). One or more transitions 412 can lead to the state where the trainee is grasping the portafilter. Moreover, the system can transition out of the state 410 by any of multiple transitions 414, for example corresponding to a successful grasp, a grasping of the wrong end of the portafilter, or that the trainee grasped the wrong object in the virtual environment.

A state 416 corresponds to the operation where the trainee tamps the coffee grounds in the portafilter to compact them in preparation for brewing (see, e.g., the tamp 208 in FIG. 2A). One or more transitions 418 can lead to the state where the trainee is tamping the coffee. The system can transition out of the state 416 by any of multiple transitions 420, for example corresponding to a successful tamping, too little tamping or too much tamping. Similarly, a state 422 relates to the trainee attaching the portafilter to the grouphead of the espresso machine, and has corresponding potential input transitions 424 and resulting transitions 426.

The model 402 can have defined therein any number of results 428 that can follow from particular operations performed by the trainee, and in particular depending on how the trainee performed them. Each of the results 428 can follow from one or more corresponding state transitions 430. For example, if the trainee performs all operations to satisfaction, the process of making coffee will be deemed a success. One or more other real-world consequences can be reflected in the results 428, including, but not limited to, that the coffee made was too weak or too strong, that the trainee failed to make any coffee, or that an injury would have resulted (for example because the trainee inadvertently touched the high-temperature steam wand on the espresso machine in the virtual environment, which could have led to a burn injury in the real situation). Quantified feedback can be provided. For example, the system can inform the trainee that he or she only turned the handle of the portafilter (see FIGS. 3B-D) 50% of the distance required for a firm attachment of the bayonet mount.

The above are examples of feedback that can be provided to the trainee during and/or after the training session. In some implementations, feedback can include audible, visual and/or tactile signals communicated to the trainee. Another example of feedback is that the training process can prevent the trainee from advancing past a certain operation unless a particular result (e.g., success on that task) has been achieved. The state model 400 can have one or more additional levels 432 of the model 402. For example, the training can be considered as divided into chapters, each of which must be completed before advancing to the next. In the event the trainee is unsuccessful in one chapter and unable to advance, the system can provide feedback on what operation(s) the trainee has failed at, identify the problem(s) and provide additional guidance (e.g., written instructions).

Figure 5:
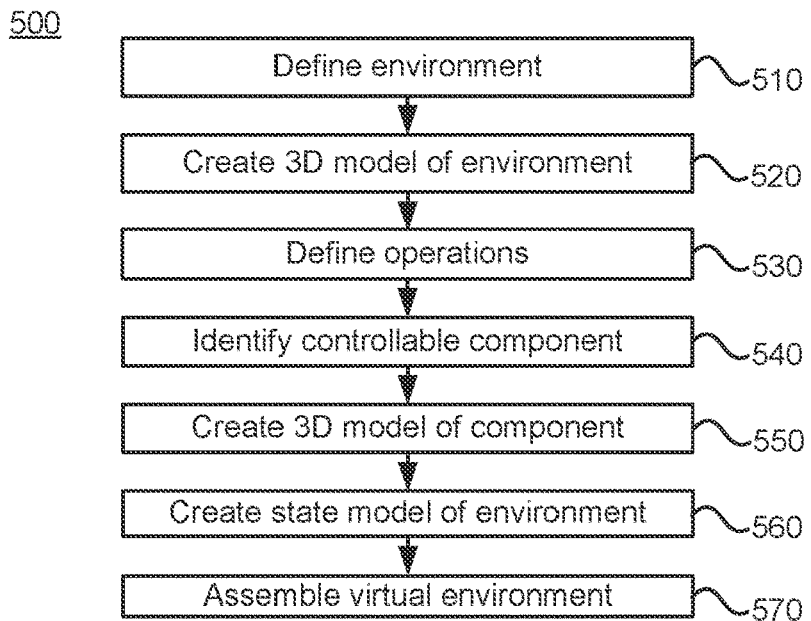
FIGS. 5-6 show examples of methods.
Figure 6:
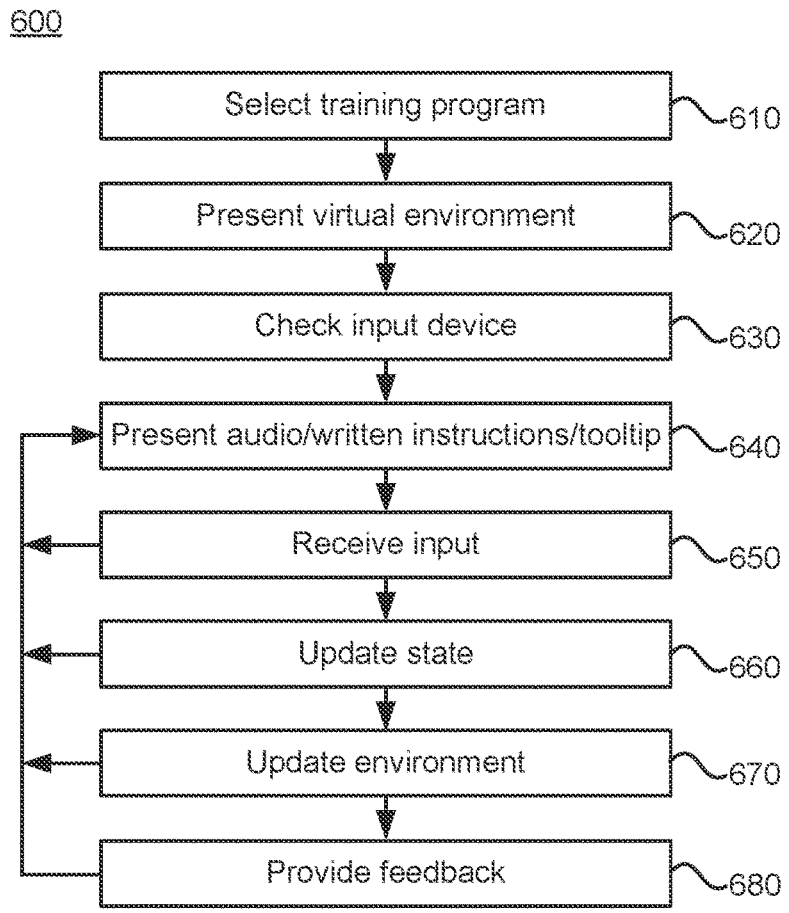

FIGS. 5-6 show examples of methods. FIG. 5 shows a method 500 relating to creating an immersive training program for a virtual instruction tool. FIG. 6 shows a method 600 relating to performing an immersive training program using a virtual instruction tool. The methods can include more or fewer steps than shows here, in some implementations. Two or more steps can be performed in a different order.

At 510, a virtual environment can be defined. Many different physical environments can serve as the definition for a virtual environment. For example, any or all of the physical environments described herein can be used.

At 520, a 3D model of the environment is created. In some implementations, this can include creating 3D objects corresponding to equipment in the physical environment. For example, machines, tools, and/or control panels can be created as 3D objects.

At 530, the operations to be performed in the training process can be defined. In some implementations, this can include analyzing the physical operations that are the basis for the training program, and dividing them into their sub-operations.

At 540, one or more controllable components in the virtual environment is identified based on the defined operation(s). In some implementations, multiple controllable components should be actuated in a particular sequence according to the training process. For example, such components can include tools, equipment and/or controls (e.g., a lever).

At 550, a 3D model of the component can be created. In some implementations, the 3D model can have at least a default (i.e., initial) state and a completed (i.e., final) state. For example, the completed state can be shown in phantom to indicate the operation to be performed.

At 560, a state model of the virtual environment can be created. In some implementations, the state model defines a number of inputs that the trainee can make during the training, the various states that the virtual environment can assume, and the potential results of performing certain operations or entering into particular states.

At 570, the virtual environment can be assembled. For example, the objects corresponding to controllable components can be positioned in their respective places, buttons for obtaining audio or written instructions or hints can be positioned, and tooltips can be created for one or more objects.

Turning now to the method 600 in FIG. 6, at 610 a training program can be selected for the virtual instruction tool. For example, a user interface can present the available programs for selection.

At 620, the virtual environment of the selected training program can be presented. For example, any virtual environment described herein can be presented to the trainee.

At 630, the tool can check the input device. For example, the tool can calibrate the input of a tracked controller so that the trainee gets an immersive experience where moving, say, the hand triggers a corresponding movement of a virtual hand in the tool.

At 640, the tool can present audio, written instructions, and/or one or more tooltips to the trainee. For example, this can serve to instruct the train how to correctly perform the next operation in the training program.

At 650, the tool receives one or more input signals generated by the trainee. For example, this can be done using a tracked controlled and/or a VR headset.

At 660, the tool can update the state of the virtual environment. For example, the trainee's input can cause the environment to transition into a different state, or to arrive at a result of performing the operations.

At 670, the tool can update the virtual environment. For example, the appearance of one or more objects can be changed depending on the trainee's input.

At 680, the tool can provide feedback to the trainee. This can be done in real time and/or at the conclusion of the training program. The feedback can inform the trainee of one or more real-world consequences resulting from the operations performed by the trainee, and/or resulting from the way the trainee performed them.

In some implementations, two or more of operations 640-680 can be performed iteratively. For example, the tool can cycle through these operations while the training program is being performed.

Figure 7A:
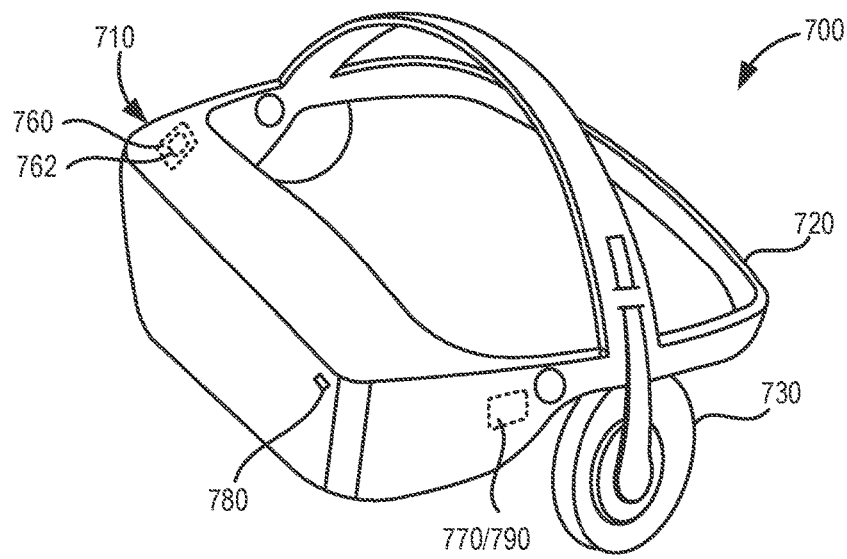
FIGS. 7A and 7B are perspective views of an example head mounted display device, in accordance with implementations as described herein.
Figure 7B:
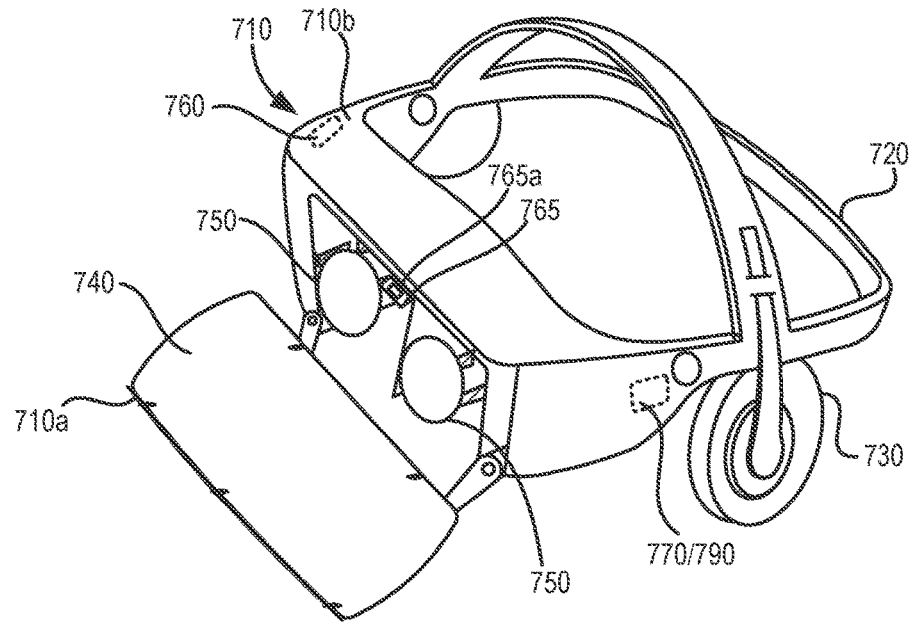

FIGS. 7A-7B are perspective views of an example HMD 700 that can be worn by a user with at least some implementations. The HMD 700 may include a housing 710 coupled to a frame 720, with an audio output device 730 including, for example, speakers mounted in headphones, also coupled to the frame 720. In FIG. 7B, a front portion 710a of the housing 710 is rotated away from a base portion 710b of the housing 710 so that some of the components received in the housing 710 are visible. A display 740 may be mounted on an interior facing side of the front portion 710a of the housing 710. Lenses 750 may be mounted in the housing 710, between the user's eyes and the display 740 when the front portion 710a is in the closed position against the base portion 710b of the housing 710. The HMD 700 may include a sensing system 760 including various sensors and a control system 770 including a processor 790 and various control system devices to facilitate operation of the HMD 700. For example, in some implementations, the sensing system 760 may include an inertial measurement unit (IMU) 762 including various different types of sensors such as, for example, an accelerometer, a gyroscope, a magnetometer, and the like. A position and orientation of the HMD 700 may be detected and tracked based on data provided by the IMU 762, allowing the system to in turn, detect and track the user's head gaze direction and movement. A camera 780 may capture still and/or moving images that may be used to help track a physical position of the user and/or other external devices in communication with/operably coupled with the HMD 700. The captured images may also be displayed to the user on the display 740 in a pass through mode.

In some implementations, the HMD 700 may include a gaze tracking device 765 including, for example, one or more sensors, to detect and track eye gaze direction and movement. Images captured by the sensor(s) 765a may be processed to detect and track direction and movement of the user's eye gaze, and the detected and tracked eye gaze may be processed as a user input to be translated into a corresponding interaction in the immersive virtual experience.

Figure 8:
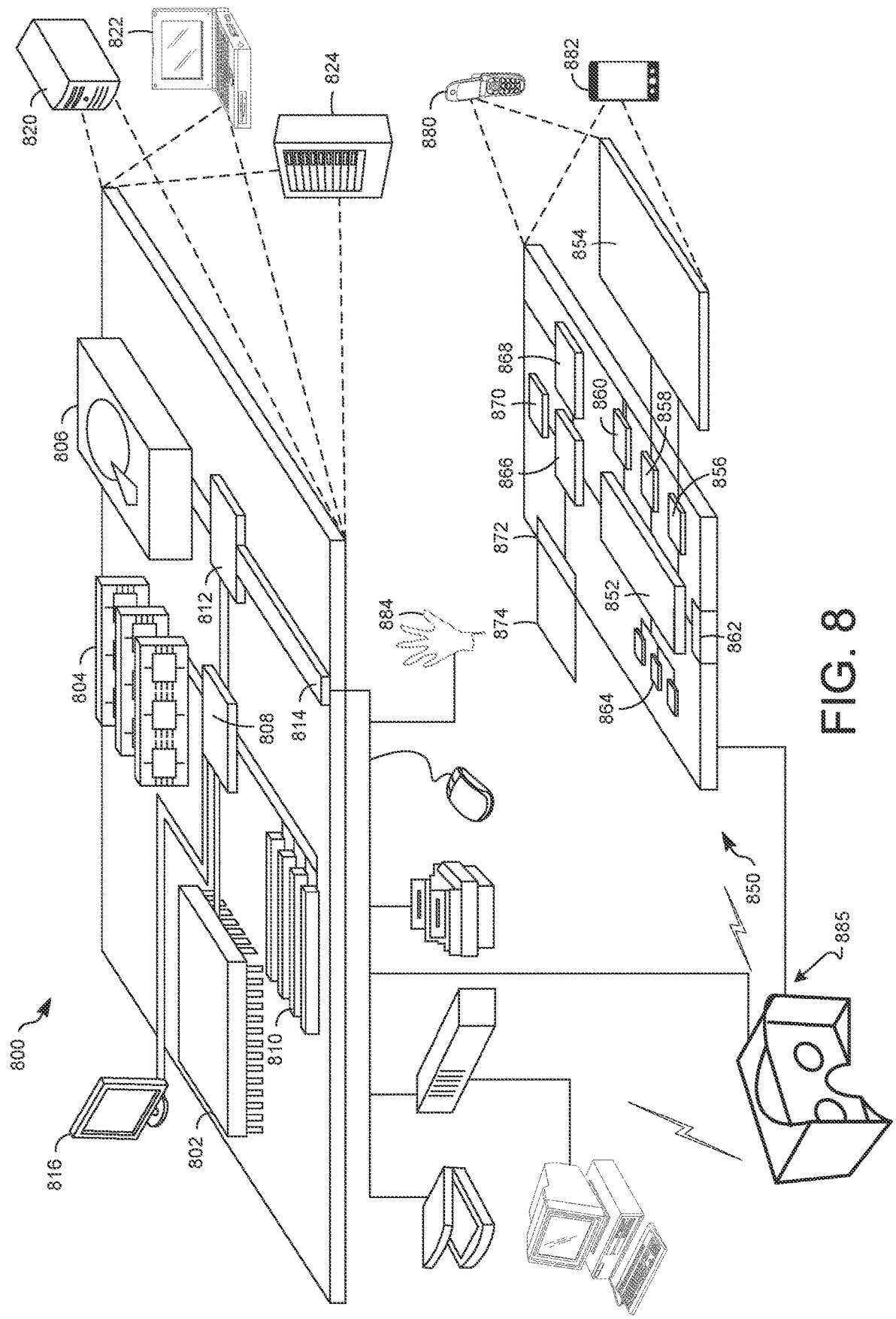
FIG. 8 shows an example of a computer device and a mobile computer device that can be used to implement the techniques described here.

FIG. 8 shows an example of a computer device and a mobile computer device that can be used to implement the techniques described here. FIG. 8 shows an example of a generic computer device 800 and a generic mobile computer device 850, which may be used with the techniques described here. Computing device 800 is intended to represent various forms of digital computers, such as laptops, desktops, tablets, workstations, personal digital assistants, televisions, servers, blade servers, mainframes, and other appropriate computing devices. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. The processor 802 can be a semiconductor-based processor. The memory 804 can be a semiconductor-based memory. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

A user can interact with a computing device using a tracked controller 884. In some implementations, the controller 884 can track the movement of a user's body, such as of the hand, foot, head and/or torso, and generate input corresponding to the tracked motion. The input can correspond to the movement in one or more dimensions of motion, such as in three dimensions. For example, the controller 884 can include a data glove.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 8 can include sensors that interface with a virtual reality (VR headset 885). For example, one or more sensors included on a computing device 850 or other computing device depicted in FIG. 8, can provide input to VR headset 885 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 850 can use the sensors to determine an absolute position and/or a detected rotation of the computing device in the VR space that can then be used as input to the VR space. For example, the computing device 850 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 850 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 850 when the computing device is incorporated into the VR space can cause a particular action to occur in the VR space.

In some implementations, a touchscreen of the computing device 850 can be rendered as a touchpad in VR space. A user can interact with the touchscreen of the computing device 850. The interactions are rendered, in VR headset 885 for example, as movements on the rendered touchpad in the VR space. The rendered movements can control objects in the VR space.

In some implementations, one or more output devices included on the computing device 850 can provide output and/or feedback to a user of the VR headset 885 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 850 may appear as another object in a computer-generated, 3D environment. Interactions by the user with the computing device 850 (e.g., rotating, shaking, touching a touchscreen, swiping a finger across a touch screen) can be interpreted as interactions with the object in the VR space. In the example of the laser pointer in a VR space, the computing device 850 appears as a virtual laser pointer in the computer-generated, 3D environment. As the user manipulates the computing device 850, the user in the VR space sees movement of the laser pointer. The user receives feedback from interactions with the computing device 850 in the VR space on the computing device 850 or on the VR headset 885.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
    identifying a physical environment to be a basis for virtual training, the physical environment associated with performance of operations;
    creating, in a computer system, a three-dimensional (3D) model of the physical environment;
    defining, in the computer system, virtual operations to be performable during the virtual training, the virtual operations corresponding to the operations of the physical environment;
    identifying, in the computer system, a controllable component in the physical environment;
    creating, in the computer system, a 3D model of the identified controllable component;
    creating, in the computer system, a state model of the physical environment; and
    assembling, in the computer system, a virtual environment from the 3D model of the physical environment and the 3D model of the identified controllable component, the virtual environment configured for performing the virtual training without operating the physical environment, and associating the created state model with the virtual environment.

2. The method of claim 1, wherein identifying the physical environment comprises identifying a machine having the controllable component, wherein the controllable component is configured to be actuated by physical action, and wherein creating the 3D model of the identified controllable component comprises taking into account the physical action of the controllable component.

3. The method of claim 1, wherein identifying the physical environment comprises identifying a machine having the controllable component, wherein the controllable component is configured to be actuated by physical action, the method further comprising identifying a distance to move the controllable component to actuate the physical action, wherein the created state model reflects the identified distance.

4. The method of claim 1, wherein creating the state model comprises defining at least one state as an operation performed on the 3D model of the controllable component, the operation being part of the virtual training.

5. The method of claim 4, wherein creating the state model further comprises defining, based on the identified physical environment, one or more transitions from the state based on the operation.

6. The method of claim 1, wherein creating the state model comprises defining results configured to be presented as feedback in response to a user undergoing the virtual training.

7. The method of claim 6, wherein the results comprise at least a success result and a failure result.

8. The method of claim 6, wherein defining the results includes defining a consequence of handling the controllable component during the virtual training, the consequence defined based on the identified physical environment.

9. The method of claim 8, wherein the consequence indicates an injury to the user.

10. The method of claim 6, wherein defining the results includes defining a quantified feedback based on the user handling the controllable component.

11. The method of claim 10, wherein the controllable component requires movement by a distance, and wherein the quantified feedback reflects a percentage completion of the distance.

12. The method of claim 1, further comprising performing the virtual training using the virtual environment and the created state model, the virtual training performed for a user and involving presenting to the user the virtual environment including the 3D model of the physical environment and the 3D model of the identified controllable component, receiving input from the user, and providing feedback to the user using the created state model based on the input.

13. The method of claim 12, wherein providing the feedback comprises providing at least one of tactile feedback or haptic feedback.

14. The method of claim 12, wherein the feedback is based on a detected impact in the virtual environment.

15. The method of claim 14, wherein providing the feedback comprises determining whether the detected impact corresponds to damage.

16. The method of claim 1, wherein the virtual operations include:
grasping the controllable component as a correct tool;
holding the controllable component properly;
properly maneuvering the controllable component; and
properly operating a machine in the virtual environment.

17. The method of claim 1, further comprising presenting a ghost version of the controllable component in the virtual environment, the ghost version corresponding to how a trainee should move or actuate the controllable component.

18. A computer program product tangibly embodied in a non-transitory medium, the computer program product comprising instructions that when executed by at least one processor cause operations to be performed, the operations including:
identifying a physical environment to be a basis for virtual training, the physical environment associated with performance of operations;
creating, in a computer system, a three-dimensional (3D) model of the physical environment;
defining, in the computer system, virtual operations to be performable during the virtual training, the virtual operations corresponding to the operations of the physical environment;
identifying, in the computer system, a controllable component in the physical environment;
creating, in the computer system, a 3D model of the identified controllable component;
creating, in the computer system, a state model of the physical environment; and
assembling, in the computer system, a virtual environment from the 3D model of the physical environment and the 3D model of the identified controllable component, the virtual environment configured for performing the virtual training without operating the physical environment, and associating the created state model with the virtual environment.

19. The computer program product of claim 18, wherein the state model is created to define states of the virtual training, inputs of the virtual training, state transitions, and corresponding results of the virtual training, the corresponding results following from one or more of the operations performed by a trainee in the virtual training, the corresponding results depending on how the trainee performed the one or more of the operations, the state model having at least one additional level, wherein the trainee must complete a chapter of the virtual training before moving to the additional level.

20. The computer program product of claim 18, wherein assembling the virtual environment comprises assembling imagery of a physical reality and imagery of virtual reality, wherein assembling the imagery of the physical reality and the imagery of the virtual reality comprises overlaying one or more virtual elements and a pass-through camera.

* * * * *

UNITED STATES PATENT AND TRADEMARK OFFICE
CERTIFICATE OF CORRECTION

PATENT NO. : 10,810,899 B1  
APPLICATION NO. : 15/830806  
DATED : October 20, 2020  
INVENTOR(S) : MacGillivray et al.

Page 1 of 1

It is certified that error appears in the above-identified patent and that said Letters Patent is hereby corrected as shown below:

On the Title Page

Column 1, Item (72), in "Inventors", Line 2, delete "Brookyln," and insert -- Brooklyn, --, therefor.

Signed and Sealed this  
Nineteenth Day of January, 2021

Andrei Iancu  
*Director of the United States Patent and Trademark Office*